(12) United States Patent
Sosna et al.

(10) Patent No.: US 12,470,506 B1
(45) Date of Patent: Nov. 11, 2025

(54) SYSTEMS AND METHODS FOR OPTIMIZED CONTROLLING OF ELECTRONIC COMMUNICATION

(71) Applicant: Veeva Systems Inc., Pleasanton, CA (US)

(72) Inventors: Arno Sosna, Pleasanton, CA (US); Stephanie Y. Shaw, Seattle, WA (US); Povilas Petkevicius, Barcelona (ES); Erik Dózsa, Foktö (HU)

(73) Assignee: Veeva Systems Inc., Pleasanton, CA (US)

( * ) Notice: Subject to any disclaimer, the term of this patent is extended or adjusted under 35 U.S.C. 154(b) by 50 days.

(21) Appl. No.: 18/529,507

(22) Filed: Dec. 5, 2023

Related U.S. Application Data

(60) Provisional application No. 63/386,545, filed on Dec. 8, 2022.

(51) Int. Cl.
*H04L 51/063* (2022.01)
*G06Q 10/107* (2023.01)

(52) U.S. Cl.
CPC ......... *H04L 51/063* (2013.01); *G06Q 10/107* (2013.01)

(58) Field of Classification Search
CPC .................... H04L 51/063; G06Q 10/107
See application file for complete search history.

(56) References Cited

U.S. PATENT DOCUMENTS

| | | | |
|---|---|---|---|
| 9,237,121 B1* | 1/2016 | Graham | H04L 51/212 |
| 11,082,407 B1* | 8/2021 | Garty | H04L 51/18 |
| 2013/0187926 A1* | 7/2013 | Silverstein | G06F 16/116 |
| | | | 345/440 |
| 2017/0099248 A1* | 4/2017 | Pisenti | H04L 51/10 |
| 2018/0219830 A1* | 8/2018 | O'Brien | H04L 61/5007 |

* cited by examiner

*Primary Examiner* — Tonia L Dollinger
*Assistant Examiner* — Joseph M Cousins

(57) ABSTRACT

Systems and methods for generating optimized tailored approved electronic messages produce email communications between user and recipients by configuring approved email templates and content that have been aligned with customer information regarding access to such content. Personalized email campaigns may be configured with predetermined publish and send deadlines. The content may be verified for accuracy and validity by the user before being delivered to the customer. The system provides for increased control of the electronic communication campaigns to recipients.

17 Claims, 6 Drawing Sheets

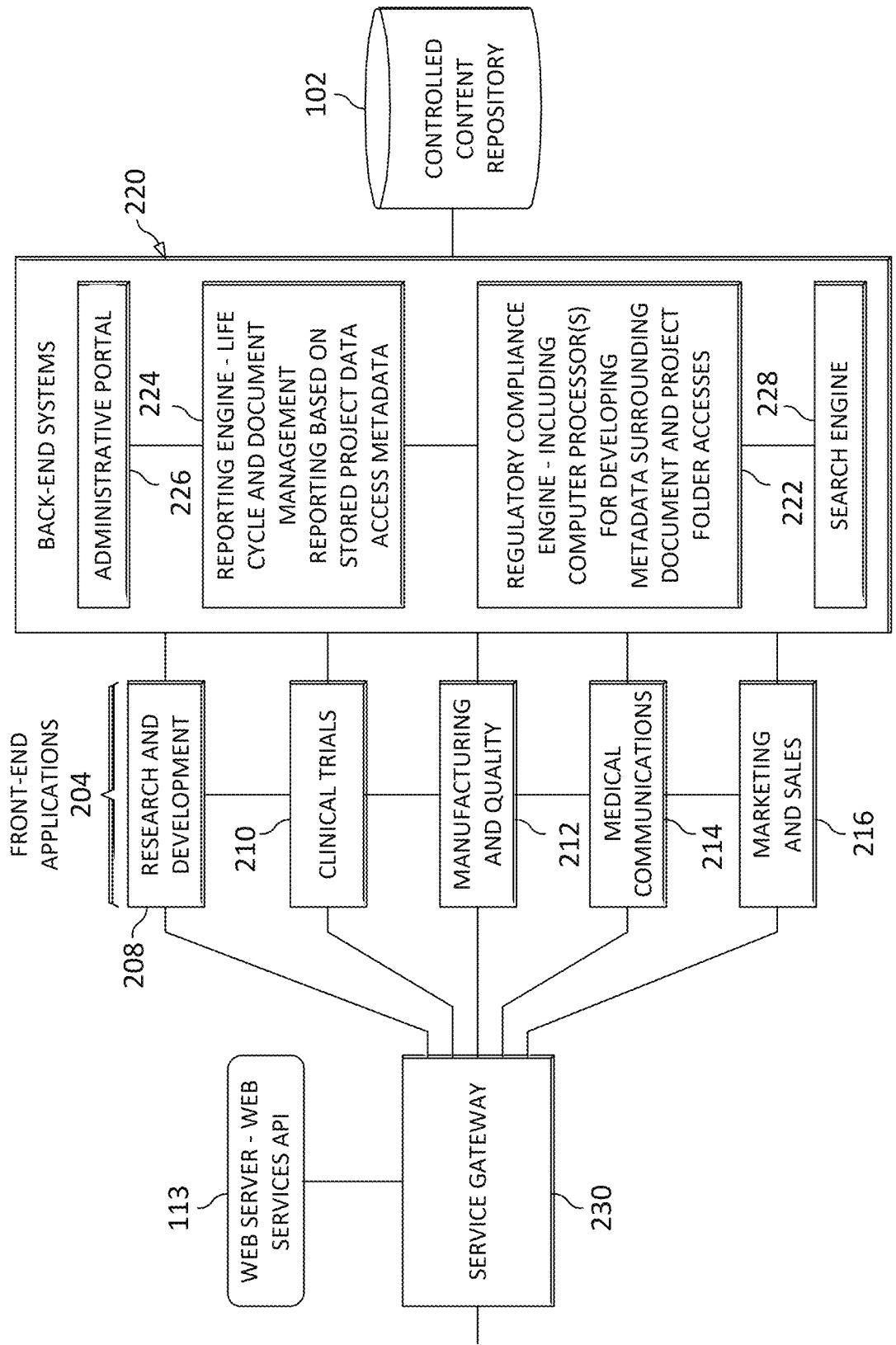

FIG. 3

301 Campaign Activity
Holiday Greeting (Vault content)

| Campaign | Scheduled Send Dateline | Record Type |
|---|---|---|
| Holiday Greeting 2022 Email Campaign | 12/20/2022 10:00 AM | Scheduled Email |
| | 302 | 303 |

304 Edit  305 Delete

306 ∨ Email Sending Configuration

Scheduled Send Datetime ⓘ
12/20/2022 10:00 AM

Email Source Field ⓘ
Account.PersonEmail

Publish Date  307
12/11/2022

> Email Template Configuration

∨ Publishing Summary  308

Successful Emails
6

Failed Emails
4

Last Publishing Job
12/11/2022 10:37 PM

> System Information

309 Email Preview   310 Sent Emails   311 Publishing History

⏱ Publishing History (2)
2 items · Updated 30 minutes ago

| | Publishing History Name ∨ | Job End Time ∨ | Total ∨ | Successful ∨ | Failed ∨ |
|---|---|---|---|---|---|
| 1 | ☐ PHN-00000001 | 12/11/2022 10:37 PM | 4 | 0 | 4 |
| 2 | ☐ PHN-00000000 | 12/11/2022 9:37 PM | 10 | 6 | 4 |

View All

SYSTEMS AND METHODS FOR OPTIMIZED CONTROLLING OF ELECTRONIC COMMUNICATION

CROSS-REFERENCE TO RELATED APPLICATIONS

The present application is a continuation application of U.S. Provisional Patent Application No. 63/386,545, filed on Dec. 8, 2022, entitled Systems and Methods for Optimized Controlling of Electronic Communication, which is hereby incorporated by reference herein for all purposes.

The present application relates to U.S. Pat. No. 9,055,023, entitled "System and method for Controlling Electronic Communications." This issued patent is hereby incorporated by reference herein for all purposes.

TECHNICAL FIELD

The present disclosure relates generally to systems and methods that provide for optimized sending of approved content to electronic communications recipients, including methods and systems for building the approved content and generating the approved messages for electronic communications such as email.

BACKGROUND

In certain fields, the ability to achieve efficiencies associated with modern electronic communications such as email has been hampered by the risks (regulatory and otherwise) of sending such electronic communications. An example of one field that has been so limited has been the pharmaceutical sales industry, where sales reps typically are restricted from sending email communications to prescribing doctors because of the enormous risks that can flow from unapproved, uncontrolled messages. For example, a careless rep or other personnel might send an email to a subscribing doctor suggesting off-label uses for a drug. This could end up exposing the company employer (e.g., a pharmaceutical company) to regulatory penalties or other legal liabilities.

SUMMARY OF THE INVENTION

Embodiments disclosed in the present document provide machine-implemented method for generating optimized tailored approved electronic messages. The method comprises: establishing a controlled content repository, the controlled content repository being securely and controllably accessed; establishing an access protocol for the controlled content repository, whereby approved content is stored in the controlled content repository according to the access protocol and whereby the access protocol comprises at least one set of alignment rules for determining if a first item of approved content within the controlled content repository can be made available to a first recipient via an electronic message; aligning the approved content within the controlled content repository with information from an information management system; generating a tailored approved electronic message template containing the first item of approved content stored in the controlled content repository and a plurality of customized data fields, whereby the approved content and the customized data fields are selected based on pre-defined electronic message campaign parameters; establishing a set of recipients including the first recipient to send the generated tailored approved electronic message template; providing an approved electronic message generating system which generates a tailored approved electronic message from the tailored approved electronic message template according to the established access protocol for sending the provided first item of approved content within the controlled content repository, to the set of recipients.

Embodiments disclosed in the present document provide a system for generating optimized tailored approved electronic messages. The system comprising: a controlled content repository, the controlled content repository being securely and controllably accessed according to an access protocol, wherein the access protocol comprises at least one set of alignment rules for determining if a first item of approved content within the controlled content repository can be made available to a first recipient via an electronic message; an information management system that aligns the approved content within the controlled content repository with stored information; a tailored approved electronic message template generator, coupled to the controlled content repository, coupled to an application over a network, providing the first item of approved content stored in the controlled content repository and a plurality of customized data fields, whereby the approved content and the customized data fields are selected based on pre-defined electronic message campaign parameters, and establishing a set of recipients including the first recipient to send the generated tailored approved electronic message template; a tailored approved electronic message generator which generates a tailored approved electronic message from the tailored approved electronic message template according to the established access protocol for sending the provided first item of approved content within the controlled content repository, to the set of recipients.

BRIEF DESCRIPTION OF THE DRAWINGS

For a more complete understanding of the present application and its advantages, references are now made to the following description taken in conjunction with the accompanying drawings, in which like reference numbers indicate like features.

FIG. 2 illustrates an example architecture for the content repository of FIG. 1 in which content is built and organized in a controlled manner that facilitates efficient content generation;

FIG. 3 illustrates an exemplary user interface for designing scheduled tailored approved email delivery;

FIG. 4 illustrates an exemplary screenshot of a tailored approved email preview interface;

FIG. 5 illustrates an exemplary screenshot of a tailored approved email delivery interface;

Although similar reference numbers may be used to refer to similar elements for convenience, it can be appreciated that each of the various example embodiments may be considered to be distinct variations.

Figure 1:
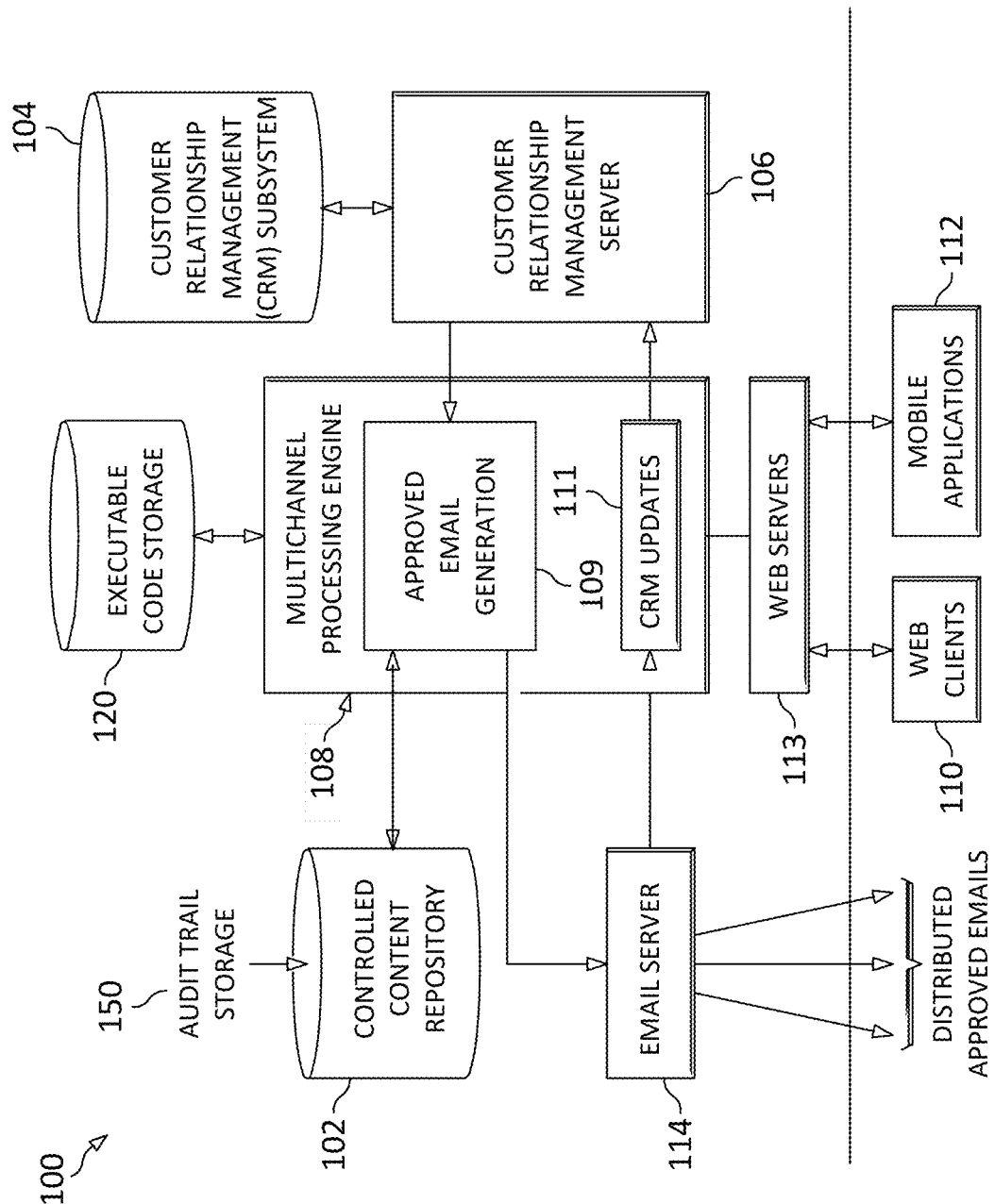
FIG. 1 illustrates an exemplary architecture for managing the building and sending of approved electronic communications.

The present embodiments will now be described hereinafter with reference to the accompany drawings, which form a part thereof, and which illustrate example embodiments which may be practiced. As used in the disclosures and the appending claims, the terms "embodiment" and "example embodiment" do not necessarily refer to a single embodiment, although it may, and various example embodiments may be readily combined and interchanged, without departing from the scope or spirit of the present embodiments. Furthermore, the terminology as used herein is for the purpose of describing example embodiments only, and are not intended to be limitations. In this respect, as used herein, the term "in" may include "in" and "on,"

DETAILED DESCRIPTION OF INVENTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

Current limitations cap the number of approved email communications that can be generated and sent. This makes designing email campaigns and processing large volumes of email an unnecessarily repetitive and painstakingly time-consuming task. There is a need for a system supporting a policy that optimizes the generation and sending of approved, compliant content to electronic communications recipients.

Embodiments disclosed in the present application allow for control of email content for communications between system users (e.g., sales reps, or pharmaceutical reps) and email recipients (e.g. health care providers, or HCPs) by providing for a system and method for generating tailored approved email communication. Customers (e.g., employers of the users, pharmaceutical companies, or campaign managers) may access a list of email templates which have been pre-generated with approved content and then aligned with various customer attributes such as regulatory limitations, customer preferences and demographic information in order to ensure compliant and tailored communication between the user and the recipient. These templates may be edited based on customer (e.g., pharmaceutical company campaign manager) customized preferences and/or personalized input from the user (e.g., pharmaceutical rep) to generate tailored approved content that can be scheduled for delivery at a later date.

Such controlled email or other electronic communication generation occurs at an interface between a repository of approved content items and templates along with customer relationship management (CRM) information including customer profile information and parameters including customer preferences and regulatory limitations or fields that can be used to facilitate compliance with regulatory limitations. The system is capable of generating warning notices to users when content and customer access do not align and users may choose various actions to address the warning notices such as excluding certain customers from the communication or changing email content. The customer information is from a customer relationship management subsystem.

In disclosed embodiments, intelligent and flexible updating of records may be provided within the customer relationship management subsystem, including such approaches as communicating with third-party systems and sources in order to verify and update customer information in an effective and timely manner, such as by using the collective information gained by managing a cloud-based system/Software-as-a-Service (SaaS) system on behalf of multiple company customers for the disclosed embodiments. After tailored approved emails are constructed by the customer and/or user, the content contained within the tailored approved email may be once again checked for accuracy and validity by the system before release to the email server. When a recipient accesses content within a tailored approved email, the recipient is directed to a customer portal through which the content is accessed. The recipient may be only allowed access to the most current version of the approved content within the content repository. In this manner, the content received and viewable by the recipient has been verified in real-time as being compliant, approved content.

FIG. 1 is a system overview illustrating an embodiment of a controlled email communication system 100. The presently disclosed embodiment comprises a controlled content repository 102, a Customer Relationship Management (CRM) server 106, and a multichannel processing engine 108. The customer relationship management server 106 may provide access to a customer relationship management subsystem 104, and the multichannel processing engine 108 may be coupled to an email server 114. In one embodiment, the customer relationship management subsystem 104 and/or the email server 114 may be operated by a third party. The multichannel processing engine 108 may be accessed by users such as company sales representatives through web clients 110 or through mobile apps 112 (such as iOS, Android, Blackberry, or Windows Mobile systems), communicating with the multichannel processing engine 108 through web servers 113. Although the users may be described in the present application as being company sales representatives, this particular described embodiment is not intended to limit the generality of the claims that may eventually issue in patents stemming from the present disclosure.

The controlled content repository 102 is designed to have a process for developing approved content that is sharable across multiple users, such as shareholders, reviewers, managers, marketing personnel, sales representatives, etc. The content generated in the controlled content repository 102 may be accessed on a regulated basis and used to generate approved electronic communications. This regulated basis may be determined, in part, by the company as a whole and additionally by interaction with data from the customer relationship management subsystem 104, described in further detail below. In one embodiment, approved content, customer profile information, customer preferences, and regulatory limitations and requirements may be stored in a table in the controlled content repository 102. In addition to storage and development of content, the controlled content repository 102 may also store an audit trail, tracking exact content of communications as they were sent by the user (e.g. pharmaceutical rep), as well as metadata about the communications and information regarding the content accessed by recipients (e.g. HCP).

The customer relationship management subsystem 104 contains all professional information of HCPs that may be available to users, including contact information, licensing information, areas of practice, and specialties. In addition, the customer relationship management subsystem 104 may also be capable of storing configurations regarding specific preferences, regulatory limitations and requirements, and other fields that will facilitate the generation of appropriate approved electronic communications, in general or on a by recipient basis. These preferences and/or requirements include both the preferences of the user (e.g., maintaining account lists) as well as the preferences of the enterprise (e.g., employers of the users), discussed in further detail below. In some examples, the approved content and email templates may be pre-processed and stored in the controlled content repository 102 and provided to the multichannel processing engine 108 during the process for generating a tailored approved email. In other examples, the customer relationship management subsystem 104 may have a content management subsystem and may provide the approved content and the templates.

In this embodiment, the customer relationship management subsystem 104 is capable of communication with multiple sources through the customer relationship management server 106 or through other channels to maintain a current and accurate collection of information regarding customer accounts. The interface with the multiple sources can be, for example, through an Applications Programming Interface or API, as the API interface will allow compatibility with a flexible array of third-party provider servers. The information being updated may include, but is not limited to, licensing information, area of practice, and location of the various customer contacts. In this manner, the customer relationship management subsystem 104 pulls the approved version of what represents an account or physician, which then pulls from multiple networks to ensure that the information regarding an account is up-to-date. The customer relationship management subsystem 104 may also be used to determine the type of domain an email communication is delivered through. A recipient in Spain may receive an email from "Companyx.es, whereas a recipient in Germany would receive the same email from "Companyx.ge." This may allow for additional branding options for the company controlling and sending the electronic communications.

With further reference to the customer relationship management subsystem 104, this system may be a cloud-based customer database that provides a central access to store and distribute consistent data across customer companies as well as their possible third-party partners and agencies that are used to keep this data updated. This system can provide standard data formats and provide an easy and automated way for customers (e.g. pharmaceutical companies campaign manager) and/or users (e.g. pharmaceutical reps) to have access to coordinated and frequently updated CRM data and to use that coordinated data for sending approved electronic communications in accordance with the system described herein. In an embodiment, the multichannel processing engine 108 is responsible for combining the customer account information from the customer relationship management subsystem 104 with content available from the controlled content repository 102. Within the customer relationship management subsystem 104, customer accounts may be assigned a set of alignment rules which determine specific pieces of content that are available for use from the controlled content repository 102. The multichannel processing engine 108 may apply these rules and supply the user with a list of approved tailored email templates and pieces of content that may then be used to construct a tailored approved email communication. Tailored approved email generation occurs within the multichannel processing engine 108 according to executable code computer instructions stored in executable code storage 120. The executable code comprises computer readable instructions stored on the computer readable medium (the code storage medium 120).

The executable code storage 120 is in communication with the various computing machines in the system 100 such as the customer relationship management server 106 and the multichannel processing engine 108. The same or another executable code storage 120 may be accessed by the previously described components of the controlled content repository 102 for providing separate computer readable code for operating upon by processing machines in that system. In all cases, the code is programmed to perform the functions that are described in the present embodiments and/or additional functions according to system design needs.

Communication between the multichannel processing engine 108 and the customer relationship management subsystem 104 may occur via the customer relationship management server 106, which acts as an interface between the two. The customer relationship management server 106 may act solely as an entry and exit point for the customer relationship management subsystem 104. The user may access the multi-channel processing engine 108 through either a Web Client 110 or through the mobile apps 112 (such as iOS, Android, Blackberry, or Windows Mobile systems).

FIG. 2 provides a description of the controlled content repository 102 with additional specific applications and interfaces connected thereto. In an embodiment, this controlled content repository 102 is a cloud-based or distributed network-based system for consolidating an enterprise's data, often times integrating multiple content repositories in an enterprise into a single system having coordinated control, measuring, and auditing of data creation, access and distribution.

In an embodiment of the controlled content repository 102 for the life sciences industry, as illustrated in the figure, this repository 102 can include specific data collections for the following areas and/or business process-specific front-end applications 204: The Research & Development (R&D) front end application 208 provides for an aggregation of materials in support of research and initial clinical trial submissions through building organized and controlled content repositories within the controlled content repository 102. Elements that can be stored, organized, and managed through this frontend include submission bills of materials, Drug Information Association (DIA) reference models support, and submission-ready renderings. This front end 208 is designed to provide an interface to the controlled content repository 102 whereby researchers, contract research organizations (CROs), and other collaboration partners can access and/or distribute content through a single controlled document system.

The clinical trials front-end application 210 provides for faster and more organized access to trial documents and reports, while supporting seamless collaboration between sponsors, CROS, sites, investigators and other trial participants. Specific features both ease study and site administration as well as support the DIA trial master file (TMF) reference model. Having this front-end application providing access to the controlled content repository 102 further provides for efficient passing off of controlled content repository content between this phase and other phases of the life sciences development process. The manufacturing and quality application 212 enables the creation, review, approval and distribution of controlled documents across the organization and with external partners in the context of materials control and other manufacturing elements. The application 212 provides functionality in support of the manufacturing process including watermarking, controlled print, signature manifestation and "Read and Understood"

signature capabilities. The documents and metadata associated with this process is managed and stored in the controlled content repository 102 whereby it can be assured that the related documents are not distributed in contravention of law and company policy.

The medical communications application 214 provides for communications with medical facilities, including call center access, integration, and interface functionality. Particular access control features and metadata associated with this application 214 include expiration and periodic review elements, multi-channel support, global documents and automatic response package generation through the controlled content repository 102.

The marketing and sales application 216 application provides an end-to-end solution for the development, approval, distribution, expiration and withdrawal of promotional materials. Specific features include Support for global pieces, approved Form FDA 2253 (or similar international forms) form generation, online document, and video annotation, and a built-in digital asset library (DAL). Again, the communications may be through the controlled content repository 102. In disclosed embodiments, there are provided a number of back-end system applications 220 that provide for the management of the data, forms, and other communications in the controlled content repository. For example, the back-end systems applications 220 may include a regulatory compliance engine 222 to facilitate regulatory compliance, including audit trail systems, electronic signatures systems, and system traceability to comply with government regulations, such as 21 CFR Part 11, Annex 11 and GXP-related requirements. The regulatory compliance engine 222 may include processors for developing metadata surrounding document and project folder accesses so from a regulatory compliance standpoint it can be assured that only allowed accesses have been permitted. The regulatory compliance engine 122 may further includes prevalidation functionality to build controlled content in support of installation qualification (IQ) and/or operational qualification (OQ), resulting in significant savings to customers for their system validation costs.

In further disclosed embodiments, the back-end systems 220 may contain a reporting engine 224 that reports on documents, their properties and the complete audit trail of changes. These simple-to-navigate reports show end users and management how content moves through its life cycle overtime, enabling the ability to track plan versus actual and identify process bottlenecks. The reporting engine may include processors for developing and reporting life cycle and document management reporting based on Stored project data and access metadata relative to documents, forms and other communications stored in the controlled content repository 102.

In further disclosed embodiments, the back-end systems 220 can include an administrative portal 226 whereby administrators can control documents, properties, users, security, workflow and reporting with a simple, point-and-click web interface. Customers also have the ability to quickly change and extend the applications or create brand new applications, including without writing additional software code.

In further disclosed embodiments, the back-end systems 220 may include a search engine 228 whereby the controlled content repository 102 can deliver simple, relevant and secure searching. In providing this holistic combination of front-end applications 204 and back-end system applications 220, the various applications can further be coordinated and communicated with by the service gateway 230, which in turn can provide for communications with various web servers and/or web services APIs 113. Such web servers and/or web services APIs 113 can include access to the content and metadata layers of some or all of the various applications 204 and systems 220, enabling seamless integration among complementary systems.

In the context of the described embodiments, the particular features and capabilities integrate with the other elements of the controlled email communication system 100 such that particular features are usable within the various user screens. For example, and without limitation to any other possible combination of features, in the below-described description of generating a tailored approved electronic communication, the above-described search portal can be used to search for approved attachments (i.e. content) within the controlled content repository 102 which may be then attached to one of the tailored template emails being prepared for sending to a recipient. And the synergy of combining these particular systems is that the generation of the controlled content can be done in a controlled fashion such that the approved content can be sent to recipients with greater confidence in the integrity of the data being sent.

In one implementation, the tailored email template may be generated by the approved email generation controller 109, as described in U.S. Pat. No. 9,055,023, entitled System and Method for Controlling Electronic Communications and issued on Jun. 9, 2015, which is hereby incorporated by reference herein for all purposes.

Figure 4:
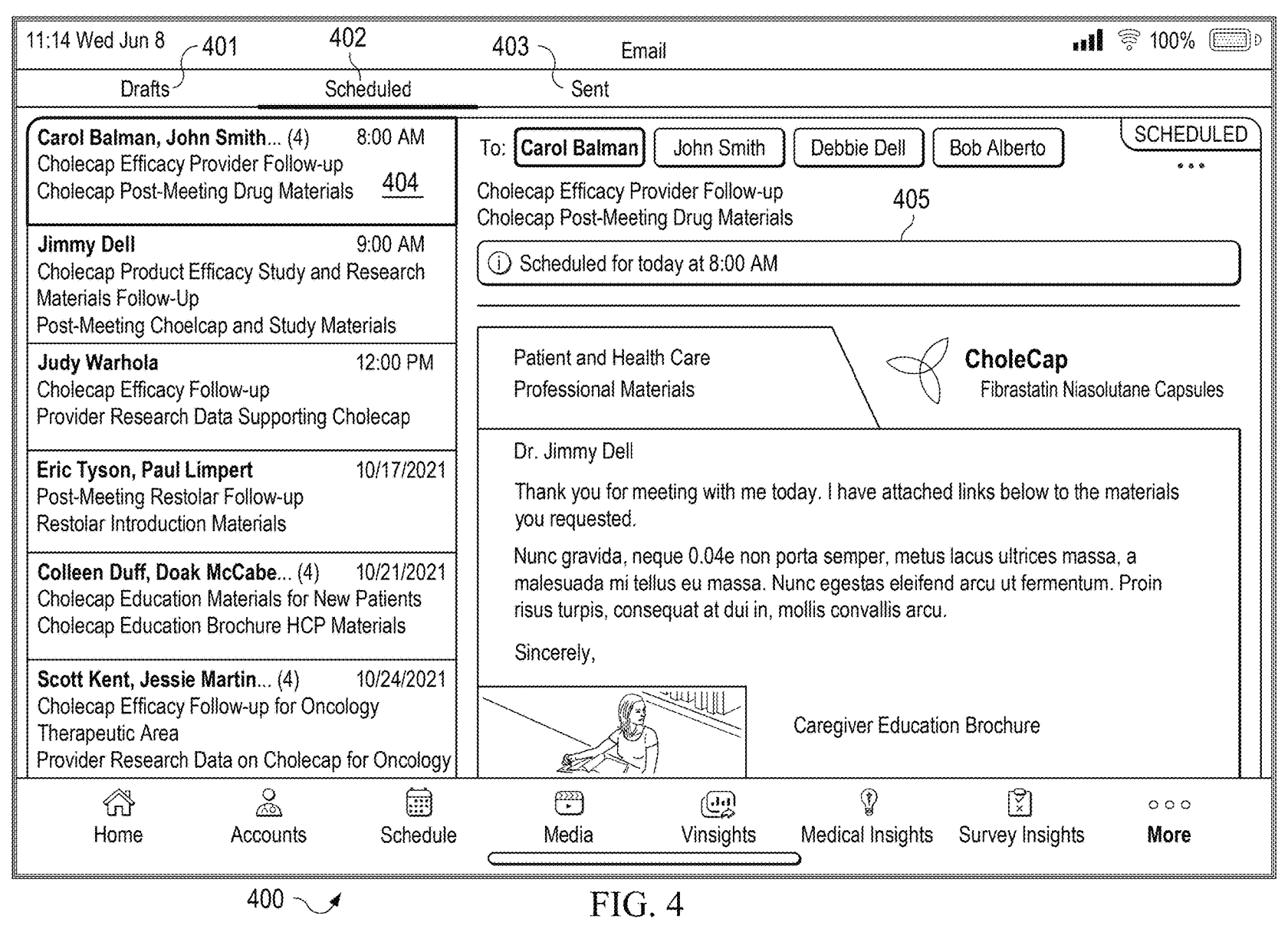

FIG. 3 illustrates an exemplary user interface in a web-based or mobile interface within a web-based system 110 or mobile system 112 (see FIG. 1). A customer (e.g., pharmaceutical company campaign manager) may design an email campaign 301 using the interface 300 depicted. As shown, the campaign 301 may have a corresponding scheduled send datetime 302 and record type 303. A customer may edit any of the electronic communication sending configurations listed in 306, modify the email template configuration in 307, or view the publishing history of the generated tailored approved content in 308. The customer may edit 304 or delete 305 any of the details by selecting the corresponding dedicated buttons on the interface 300. In one implementation, a customer (e.g. pharmaceutical company campaign manager) may access a listing of email previews from the associated tab 309. Each listing can redirect to an exemplary tailored approved email preview screen 400 illustrated in FIG. 4. The scheduled tailored approved emails are listed in 404 and accessed under the scheduled tab 402. The drafts and previously delivered emails may be accessed under the drafts tab 401 and sent tab 403, respectively. In one implementation, the drafts tab 401 includes optional campaign tailored approved email templates that do not have a scheduled send datetime. In this implementation, the user (e.g., pharmaceutical rep) instead of the customer (e.g., pharmaceutical company campaign manager) may set the scheduled send datetime. Notifications or warnings 405 may be shown in the tailored approved email preview. For instance, the scheduled send datetime may be displayed. When a tailored approved email is opened by the recipient, the recipient may have immediate access to communications as they appeared in the "preview" screens or thumbnails available to the user through the web-based or mobile applications 112. This preview screen 400 includes the readable text and a tiled list of approved content hyperlinks, shown in the figure. The recipient may choose to view the content by selecting the appropriate content icon. In an embodiment of the system, the recipient may select the "view pdf" hyperlink within the email, which will redirect the recipient to the customer portal screen. Each recipient has the ability to custom-configure the specific URL to be loaded as the "landing page" for clicks from the tailored approved emails. The specifics will be discussed in more detail in the corresponding FIG. 6.

In one implementation, warnings or notifications may be displayed for reasons that include, but are not limited to, regulatory limitations, customer preferences, demographic information, a customer "opt-out" option where the customer has requested to not have the content delivered; the absence of a customer "opt-in" option where the customer may not receive the communication without prior approval; or that the most current information contained within the customer account profile no longer allows access to the current content delivered by the controlled content repository 102. Information regarding regulatory limitations, customer preferences, demographic information, the "opt-in" or "opt-out" status of individual customer accounts is stored within the customer relationship management subsystem 104.

Once all warnings are cleared, or all restricted recipients are removed from the list, the customer may once again have access to the tailored approved email template.

Figure 5:
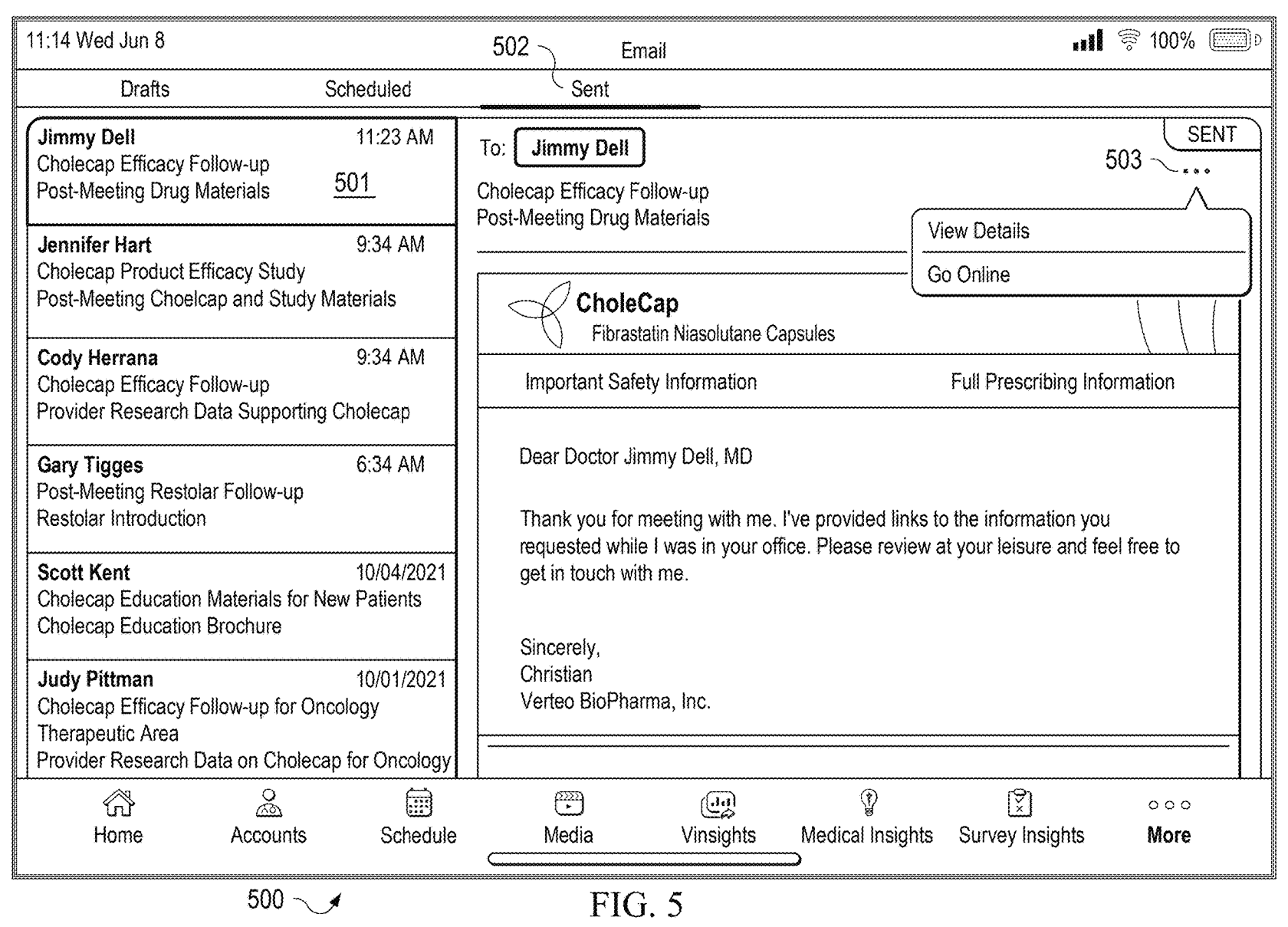

In one implementation, a customer (e.g., pharmaceutical company campaign manager) may access a listing of sent emails from the associated tab 310. Each listing can redirect to an exemplary tailored approved email sent screen 500 illustrated in FIG. 5. The delivered tailored approved emails are listed in 501 and accessed under the sent tab 502. Additional details are accessible through 503. The specifics will be discussed in further detail in the corresponding FIG. 6.

Figure 6:
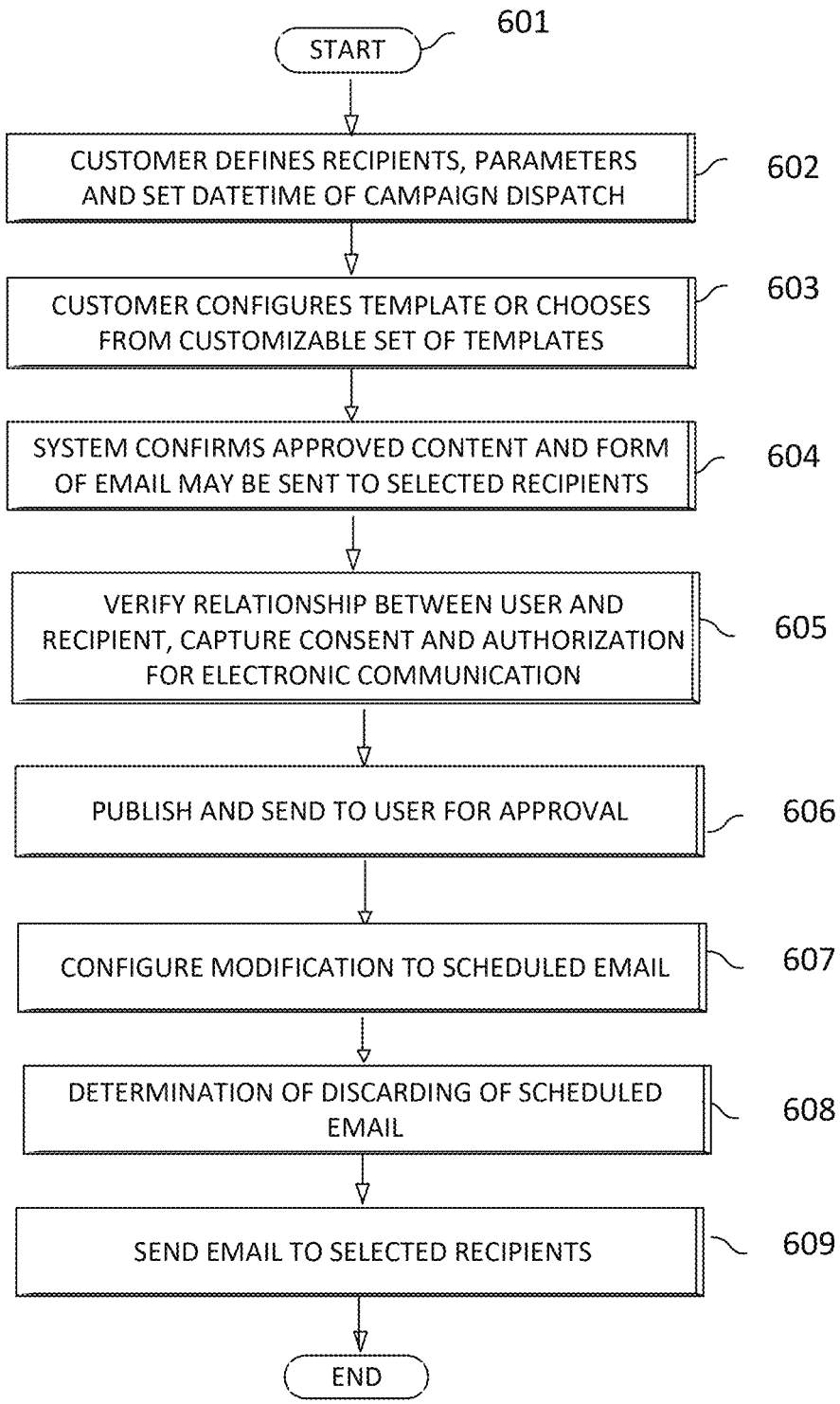
FIG. 6 illustrates a flowchart illustrating the building and provisioning of exemplary elements of an optimized tailored approved email system in accordance with the embodiments disclosed in the present application.

FIG. 6 is a flowchart illustrating the building and provisioning of exemplary elements of an optimized tailored approved email system in accordance with the embodiments disclosed in the present application. The process may start at 601.

At 602, a customer (e.g., pharmaceutical company campaign manager) may define the target recipients for the electronic communications, as well as additional parameters for the campaign, and may set a datetime the electronic communications campaign is due to send out to recipients (e.g. HCPs). In one embodiment, customers may access pre-constructed lists of individual recipients as configured in the customer relationship management subsystem 104. The customer may also select a number of individual recipient (e.g. HCPs) accounts with whom the user (e.g. pharmaceutical rep) has a relationship. For instance, different recipients (e.g., HCPs) may be assigned to different users (e.g., pharmaceutical rep) in the customer relationship management subsystem 104. Alternatively, recipients (e.g., HCPs) may be interested in different products (e.g., pharmaceutical drugs) which are assigned to different users (e.g. pharmaceutical rep).

In one implementation, the datetime may be set in accordance to a recipient's (e.g., HCP) preferences. For instance, in some countries like Japan, for example, Labor Standards Act dictates that a company must prevent each sales rep from working overtime. If the HCP's preferred time is after work hours, the sales rep cannot log into the system to manually send the email. However, with the enhanced capability to set the datetime in advance, each sales rep can schedule electronic communications delivery to HCPs during their normal working hours.

At 603, a customer (e.g., pharmaceutical company campaign manager) may create an electronic communication campaign. In one implementation, the customer may create and/or configure a tailored approved email template. A user may access pre-approved, controlled email templates that are available and approved for a specific group of customers selected. In another implementation, the customer may have the ability to personalize the email content by free-texting in a text box supplied within the template. This customizable text box may also be regulated to ensure compliance by limiting the number of characters that may be typed in the box and by constructing "libraries" of restricted words for each customer that may not be used in the box. The information used to regulate the text box may be accessed from the customer relationship management subsystem 104, and configuration of these regulatory parameters may be designated by both the company, by the specific customer, and/or by specific regulation. Within the approved template, the customer (e.g. pharmaceutical company campaign manager) may choose from approved content to be included in the body of the email.

In another embodiment, the customer (e.g., pharmaceutical company campaign manager) may also select a customized field from a drop-down menu located within the template. The overall approved content authoring system described herein includes selection capabilities that are highly flexible, highly configurable, and may be applicable to any place within the tailored approved email template. Data or information fields from the customer relationship management subsystem 104 may be extracted and provided to the tailored approved email template.

At 604, the system, or more specifically the multichannel processing engine 108 confirms that the tailored approved content and form of email may permissibly be sent by the prospective email sender to the recipients based on factors including but not limited to regulatory limitations, customer preferences, demographic information, or the "opt-in" or "opt-out" status of individual recipient accounts. Once that has been confirmed in accordance with the access protocol, the multichannel processing engine 108 can begin building and sending the emails in accordance with the customer's selections or as modified in accordance with the access protocol, regulator engine, and or other system controls. The content contained within the tailored approved email may be checked for accuracy and validity by the system before release to the email server 114.

The flowcharts do not mean to limit the sequence of the steps. In one example, the controlled content repository 102 may determine in advance, before a template is chosen at 603, if a piece of content can be sent to a customer and store the result. The result may be stored as part of metadata for the content in the controlled content repository 102. During the generation of the tailored approved email, the multichannel processing engine 108 may check information in the controlled content repository 102, instead of the customer relationship management subsystem 104, to decide if a piece of content can be sent to a customer.

At 605, the relationship between the user (e.g., pharmaceutical rep) and the recipient (e.g., HCP) is verified by the multichannel processing engine 108 and used to ensure the generated tailored approved email is created for the current user (e.g., pharmaceutical rep) associated/assigned to the recipient (e.g., HCP). In another implementation, the relationship between the user and the recipient can also be used to determine consent. For instance, customers in the US deploy the implicit consent model. No consent needs to be captured to send email as long as there is a business relationship between the sender and recipient. In other words, consent is implicit. However, based on the jurisdiction, regulations, and individual customer settings, other consent models may be required. In an alternative implementation, the multichannel processing engine 108 may determine consent to be explicit. The multichannel processing engine 108 identifies a consent type and/or consent level from email records, or settings/preferences accessed from the customer relationship management subsystem 104 and based on the type and/or level determines the consent is in explicit mode.

At 606, depending on the configured publish date, the tailored approved email is sent to the user (e.g. pharmaceutical rep) for approval. In one implementation, the configured publish date may be different and distinct from the scheduled send datetime. The user may verify the content or recipients for accuracy, or tailor the content based on their relationship with the recipient. When the current date hits the configured publish date, the multichannel processing engine 108 generates a tailored approved email for each configured recipient in the campaign 602 based on the tailored approved email template created in 603. During this publishing process, the email record is also updated with campaign and email publishing details.

At 607, the user (e.g., pharmaceutical rep) may modify the tailored approved email content. In one implementation, when the current datetime is before the scheduled send datetime 302, the content delivered by the controlled content repository 102, text-box and/or customized fields may each be edited accordingly based on personalized effect from interactions and connections between the user and recipient. In another implementation, additional content from the controlled content repository 102, text-boxes, and/or customized fields may be added to the tailored approved email to increase the personalized effect of the approved email based on the user's relationship with the recipient.

At 608, the user (e.g., pharmaceutical rep) may cancel or discard the tailored approved email. The discarding of the tailored approved email is tracked to prevent the republishing of discarded tailored approved emails. For instance, on the configured publish date, the tailored approved email is generated and subsequently discarded by the user. On the same day, the publishing process runs again and to ensure a tailored approved email is only published once, the system, or more specifically the multichannel processing engine 108 prevents the regeneration of the previously discarded tailored approved email.

At 609, the user (e.g., pharmaceutical rep) may accept the tailored approved email in its current form. In one implementation, when the current datetime is before the scheduled send datetime 302, after the user approves the tailored approved email, the multichannel processing engine 108 releases the tailored approved email to the email server 114. The email server may then send the tailored approved email to the designated recipients (e.g., HCPs).

In another implementation, when the current datetime hits the scheduled send datetime 302, the tailored approved email can be automatically sent by the email server 114 to the designated recipients. This option may be configured by the customer (e.g. pharmaceutical company campaign manager) when configuring the campaign in 603.

In another implementation, the scheduled send datetime may be optional. When the customer (e.g. pharmaceutical company campaign manager) omits the scheduled send datetime, the generated tailored approved email template is saved as a draft and sent to the user on the configured publish date. The user (e.g., pharmaceutical rep) may, at their leisure, accept the tailored approved email in 609 and send the tailored approved email to the designated recipients (e.g., HCPs), modify the tailored approved email in 607, or cancel/discard the tailored approved email in 608.

While various embodiments have been described above, it should be understood that they have been presented by way of example only, and not limitation. Thus, the breadth and scope of a preferred embodiment should not be limited by any of the above described exemplary embodiments, but should be defined only in accordance with the claims and their equivalents for any patent that issues claiming priority from the present provisional patent application.

For example, although the embodiments are described with a customer relationship management subsystem 104, the customer information and content may be from other types of information management systems, e.g., a Closed Loop Marketing (CLM) system. In addition, the multichannel processing engine 108 is shown to communicate with only one customer relationship management subsystem 104 in the drawings, but it may communicate with more customer relationship management subsystems. For example, as referred to herein, a machine or engine may be a virtual machine, computer, node, instance, host, or machine in a networked computing environment. Also as referred to herein, a networked computing environment is a collection of machines connected by communication channels that facilitate communications between machines and allow for machines to share resources. Network may also refer to a communication medium between processes on the same machine. Also as referred to herein, a server is a machine deployed to execute a program operating as a socket listener and may include software instances.

In all descriptions of "servers" or other computing devices herein, whether or not the illustrations of those servers or other computing devices similarly show a server-like illustration in the figures, it should be understood that any such described servers or computing devices will similarly perform their described functions in accordance with computer readable instructions stored on a computer-readable media that are connected thereto.

Resources may encompass any types of resources for running instances including hardware (such as servers, clients, mainframe computers, networks, network storage, data sources, memory, central processing unit time, Scientific instruments, and other computing devices), as well as software, software licenses, available network services, and other non-hardware resources, or a combination thereof.

A networked computing environment may include, but is not limited to, computing grid systems, distributed computing environments, cloud computing environment, etc. Such networked computing environments include hardware and Software infrastructures configured to form a virtual organization comprised of multiple resources which may be in geographically disperse locations.

The approved content may be in any format, e.g., text, audio, video, picture, multimedia, or PDF.

Various terms used herein have special meanings within the present technical field. Whether a particular term should be construed as such a "term of art, depends on the context in which that term is used. "Connected to," "in communication with or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

The steps and/or operations described above in relation to an embodiment of the present disclosure may occur in a different order, or in parallel, or concurrently for different epochs, etc. depending on the specific embodiment and/or implementation, as would be understood by one of ordinary skill in the art. Different embodiments may perform actions in a different order or by different ways or means. As would be understood by one of ordinary skill in the art, some drawings are simplified representations of the actions performed, their descriptions herein simplified overviews, and real-world implementations would be much more complex, require more stages and/or components, and would also vary depending on the requirements of the particular implementation. Being simplified representations, these drawings do not show other required steps as these may be known and understood by one of ordinary skill in the art and may not be pertinent and/or helpful to the present description.

Similarly, some drawings are simplified block diagrams showing only pertinent components, and some of these components merely represent a function and/or operation well-known in the field, rather than an actual piece of hardware, as would be understood by one of ordinary skill in the art. In such cases, some or all of the components/modules may be implemented or provided in a variety and/or combinations of manners, such as at least partially firmware and/or hardware, including, but not limited to one or more application-specific integrated circuits ("ASICS"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

One or more processors, simple micro controllers, controllers, and the like, whether alone or in a multi-processing arrangement, may be employed to execute sequences of instructions stored on non-transitory computer-readable media to implement embodiments of the present disclosure. In some embodiments, hard-wired circuitry may be used in place of or in combination with software instructions. Thus, embodiments of the present disclosure are not limited to any specific combination of hardware circuitry, firmware, and/or software.

The term "computer-readable medium" as used herein refers to any medium that stores instructions which may be provided to a processor for execution. Such a medium may take many forms, including but not limited to, non-volatile and volatile media. Common forms of non-transitory computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium on which instructions which can be executed by a processor are stored. The computer readable media does not include carrier waves and electronic signals passing wirelessly or over wired connections.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background is not to be construed as an admission that technology is prior art to any invention(s) in this disclosure. Neither is the "Brief Summary" to be considered as a characterization of the invention(s) set forth in issued claims. Furthermore, any reference in this disclosure to "invention' in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The invention claimed is:

1. A computer-implemented method for generating optimized tailored approved electronic messages, the method comprising:

establishing a controlled content repository, the controlled content repository being securely and controllably accessed;

establishing an access protocol for the controlled content repository, whereby approved content is stored in the controlled content repository according to the access protocol and whereby the access protocol comprises at least one set of alignment rules for determining if a first item of approved content within the controlled content repository can be made available to a first recipient via an electronic message;

aligning the approved content within the controlled content repository with information from an information management system;

generating a tailored approved electronic message template containing the first item of approved content stored in the controlled content repository and a plurality of customized data fields, whereby the approved content and the customized data fields are selected based on pre-defined electronic message campaign parameters;

establishing a set of recipients including the first recipient to send the generated tailored approved electronic message template;

providing an approved electronic message generating system which generates a tailored approved electronic message from the tailored approved electronic message template according to the established access protocol for sending the provided first item of approved content within the controlled content repository, to the set of recipients;

extracting the plurality of customized data fields from the information management system and inputting the extracted plurality of customized data fields into the tailored approved electronic message template to generate the tailored approved electronic message;

verifying the tailored approved electronic message may permissibly be sent to the set of recipients based on using a consent type and a consent level to determine a consent model for ascertaining whether the tailored approved electronic message may permissibly be sent to the set of recipients; and scheduling a validation deadline to send the generated tailored approved electronic message to the set of recipients.

2. The computer-implemented method of claim 1, further comprising:
providing the first item of approved content within the controlled content repository for selection by a sender after a determination that the first item of approved content within the controlled content repository is authorized to be made available to the first recipient in accordance with the at least one set of alignment rules.

3. The computer-implemented method of claim 1, further comprising sending the generated tailored approved electronic message to a user for validation.

4. The computer-implemented method of claim 3, wherein the validating the tailored approved electronic message includes sending the generated tailored approved electronic message to a user for verification prior to the scheduled validation deadline.

5. The computer-implemented method of claim 4, wherein the user validation includes a user approving, modifying or discarding the tailored approved electronic message.

6. The computer-implemented method of claim 3, wherein the user validation includes discarding the tailored approved electronic message, and tracking the discarded tailored approved electronic messages to prevent republishing.

7. The computer-implemented method of claim 1, wherein the set of verification factors includes one or more of the following: regulatory limitations, customer preferences, demographic information, or the "opt-in" or "opt-out" status of individual recipient accounts.

8. The computer-implemented method of claim 1, wherein the verifying the tailored approved electronic message may permissibly be sent to the set of recipients is based on the relationship between the user and the set of recipients.

9. The computer-implemented method of claim 1, further comprising: when the scheduled validation deadline has expired, sending the generated tailored approved electronic message to the set of recipients automatically.

10. The computer-implemented method of claim 3, further comprising: modifying the tailored approved electronic message prior to sending the generated tailored approved electronic message to the set of recipients.

11. The computer-implemented method of claim 1, further comprising wherein the information management system is a customer relationship management (CRM) system.

12. The computer-implemented method of claim 1, wherein the access protocol is based on regulatory restrictions.

13. The computer-implemented method of claim 12, wherein the access protocol is further based on customer profile information.

14. The computer-implemented method of claim 1, further comprising: displaying a warning when it is determined that the first item of approved content cannot be made available to the first recipient.

15. The computer-implemented method of claim 1, wherein the controlled content repository is adapted to provide development and distribution of promotional materials as related to regulatory restricted prescription drugs.

16. A system for generating optimized tailored approved electronic messages, the system comprising:
a controlled content repository, the controlled content repository being securely and controllably accessed according to an access protocol, wherein the access protocol comprises at least one set of alignment rules for determining if a first item of approved content within the controlled content repository can be made available to a first recipient via an electronic message;
an information management system that aligns the approved content within the controlled content repository with stored information;
a tailored approved electronic message template generator, coupled to the controlled content repository, coupled to an application over a network, providing the first item of approved content stored in the controlled content repository and a plurality of customized data fields, whereby the approved content and the customized data fields are selected based on pre-defined electronic message campaign parameters, and establishing a set of recipients including the first recipient to send the generated tailored approved electronic message template;
a tailored approved electronic message generator extracts the plurality of customized data fields from the information management system and inputs the extracted plurality of customized data fields into the tailored approved electronic message template to generate a tailored approved electronic message from the tailored approved electronic message template according to the established access protocol for sending the provided first item of approved content within the controlled content repository, to the set of recipients, verifies the tailored approved electronic message may permissibly be sent to the set of recipients based on using a consent type and a consent level to determine a consent model for ascertaining whether the tailored approved electronic message may permissibly be sent to the set of recipients, and schedules a validation deadline to send the generated tailored approved electronic message to the set of recipients.

17. A non-transitory computer-readable medium containing instructions causing a computer to execute a computer-implemented method for generating optimized tailored approved electronic messages, the method comprising:
establishing a controlled content repository, the controlled content repository being securely and controllably accessed;
establishing an access protocol for the controlled content repository, whereby approved content is stored in the controlled content repository according to the access protocol and whereby the access protocol comprises at least one set of alignment rules for determining if a first item of approved content within the controlled content repository can be made available to a first recipient via an electronic message;

aligning the approved content within the controlled content repository with information from an information management system;

generating a tailored approved electronic message template containing the first item of approved content stored in the controlled content repository and a plurality of customized data fields, whereby the approved content and the customized data fields are selected based on pre-defined electronic message campaign parameters;

establishing a set of recipients including the first recipient to send the generated tailored approved electronic message template;

providing an approved electronic message generating system which generates a tailored approved electronic message from the tailored approved electronic message template according to the established access protocol for sending the provided first item of approved content within the controlled content repository, to the set of recipients;

extracting the plurality of customized data fields from the information management system and inputting the extracted plurality of customized data fields into the tailored approved electronic message template to generate the tailored approved electronic message;

verifying the tailored approved electronic message may permissibly be sent to the set of recipients based on using a consent type and a consent level to determine a consent model for ascertaining whether the tailored approved electronic message may permissibly be sent to the set of recipients; and scheduling a validation deadline to send the generated tailored approved electronic message to the set of recipients.

* * * * *